May 19, 1959  R. P. CONROY  2,887,083
OUTBOARD MOTOR CLUTCH CONTROL MECHANISM
Filed Nov. 15, 1954  2 Sheets-Sheet 1

INVENTOR
ROBERT P. CONROY
BY Steve W. Grenban
ATTORNEY

May 19, 1959  R. P. CONROY  2,887,083
OUTBOARD MOTOR CLUTCH CONTROL MECHANISM
Filed Nov. 15, 1954  2 Sheets-Sheet 2

INVENTOR
ROBERT P. CONROY
BY Steve W. Grambau
ATTORNEY

United States Patent Office 2,887,083
Patented May 19, 1959

2,887,083

OUTBOARD MOTOR CLUTCH CONTROL MECHANISM

Robert P. Conroy, Fond du Lac, Wis., assignor to Kiekhaefer Corporation, Cedarburg, Wis.

Application November 15, 1954, Serial No. 468,788

6 Claims. (Cl. 115—18)

This invention relates generally to outboard motors and more specifically to an improved shifter control means for the gear shift transmission mechanism of an outboard motor.

Outboard motors have for some time been equipped with a shifter control mechanism and transmission system having a neutral, forward and reverse position adapted to place the propeller and propeller shaft, while the engine is operating, in a nonrotatable position, or to rotate the propeller and propeller shaft in a forward or reverse direction. The prior art shifter control mechanism which is adapted to place the transmission in a neutral, forward or reverse position is a complicated link arrangement separate from the drive shaft. The disadvantages of this type of shifter control mechanism are that the housing of the outboard motor must be made larger and must be specially designed to accommodate the parts thereof, and the large number of parts and complicated link arrangement presents operational difficulties.

It is therefore an object of the present invention to provide an improved shifter control mechanism for the transmission of an outboard motor that consists of fewer parts and is less complicated than prior known shifter control systems.

Another object of the invention is the provision of an improved shifter control mechanism for an outboard motor that eliminates the need of a large and specially designed housing to accommodate same.

Another object of the invention is the provision of an improved shifter control mechanism that is relatively free of operational difficulties.

Objects and advantages other than those set forth above will be apparent from the following description when read in connection with the accompanying drawing, in which.

Figures 1, 6:
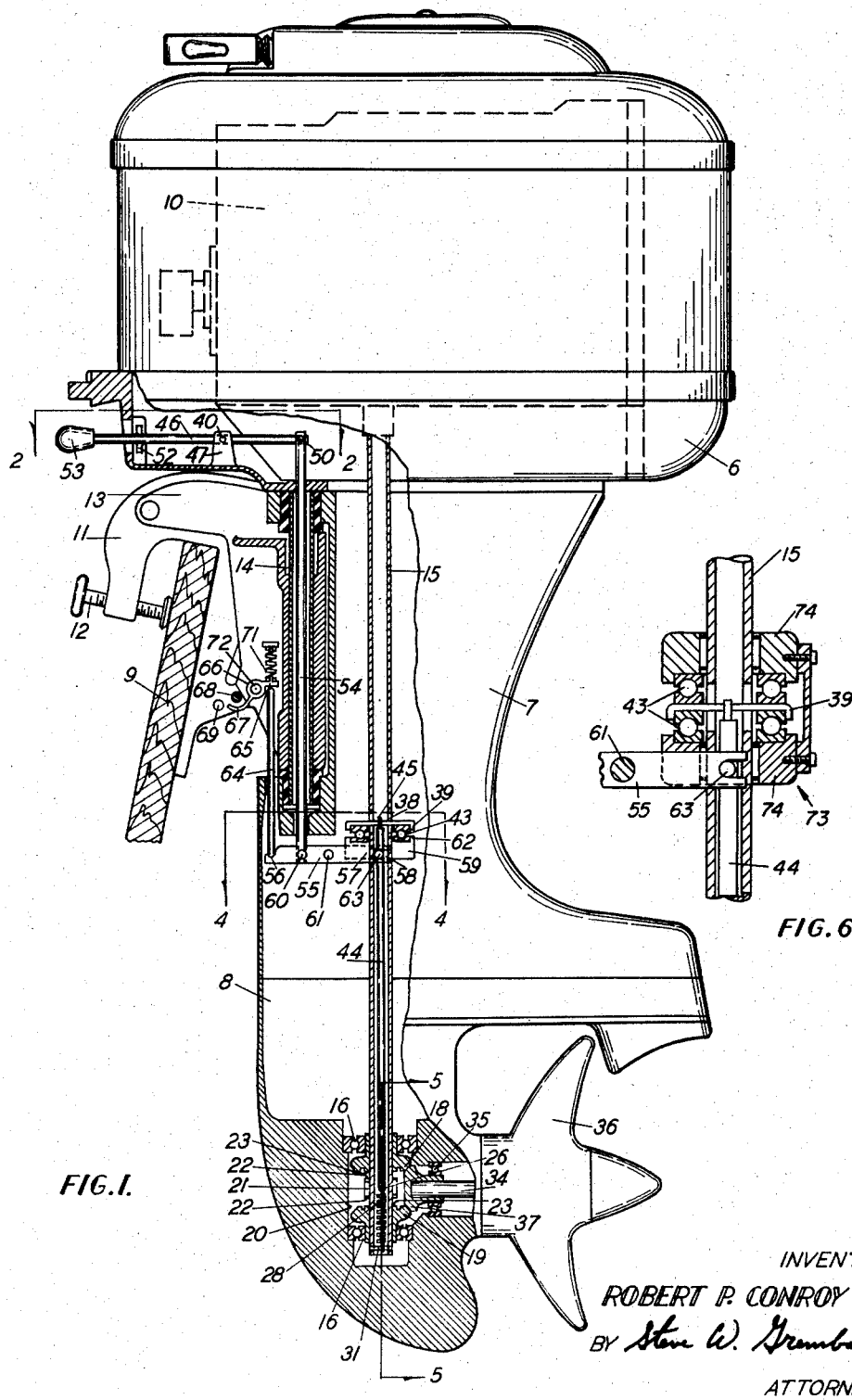
Fig. 1 is a side elevation view partially in section showing the gear shift mechanism and control means therefor.
Fig. 6 is a view similar to Fig. 3 and shows means providing for positive actuation of the clutch element.

As shown in the drawing, a preferred embodiment of this invention is illustrated as applied to a conventional outboard motor having a cowl 6 enclosing an engine 10 shown dotted in Fig. 1 mounted on a housing 7, and an underwater gear case 8 secured to the lower end of the housing 7. The outboard motor is removably secured to the transom 9 of a boat (not shown) by means of a clamp bracket 11 having screw clamps 12 adapted to engage one side of the transom 9. The clamp bracket 11 pivotably supports an intermediate swivel bracket 13 which is pivotably connected to the housing 7 of the motor by means of a hollow pivot rod 14 for turning the motor on a vertical axis for purposes of steering.

Figure 5:
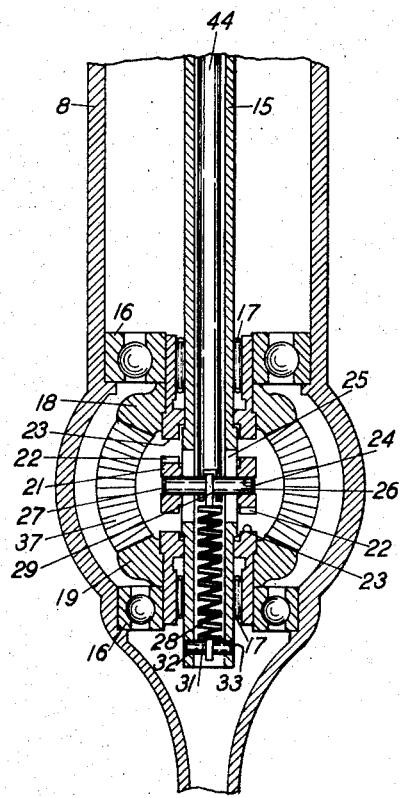
Fig. 5 is an enlarged fragmentary view in section taken along line 5—5 of Fig. 1.

The gear shift transmission system of the outboard motor, in which the present invention is embodied, comprises a hollow or tubular drive shaft 15 of suitable material capable of withstanding the high operational stresses involved disposed within the housing 7 and connected at one end by means of a spline connection, not shown, to the lower end of the engine crank shaft, not shown, which extends downwardly into the upper end of the housing 7. The other end of the drive shaft 15 extends downwardly into a stepped bore 20 provided in the gear case 8 where it is supported by any suitable bearings shown as ball bearings 16, and journaled within needle bearings 17 carried by a pair of beveled gears 18, 19 as shown in Fig. 5 which are free to rotate around the shaft 15 in either direction. The gears 18, 19 are supported and prevented from vertical movement caused by the axial thrust of gear 37 by the action of the bearings 16. A clutch element 21 is carried on the shaft 15 and disposed between positive engagement clutch faces 23 of the gears 18, 19 and has clutch faces 22 on each end thereof adapted to selectively engage the respective complementary face 23 of the corresponding gears 18, 19. The clutch element 21 further has a diametral opening 24 registering with an elongated diametral opening 25 provided in the shaft 15, and a pin 26 passing through the openings 24, 25 to lock the clutch element 21 to the shaft 15 for rotation therewith and provide for axial movement with respect thereto. The pin 26 is prevented from lateral movement out of the opening 24 by means of a circular spring clamp 27 provided at each end of the pin. A spring 28 is disposed in the lower portion of the shaft 15 having one end connected to the pin 26 by any suitable means such as a hook 29 and the other end connected by similar means to a bolt 31 positioned in a diametral opening 32 provided in the end of the shaft 15. The bolt 31 is similarly prevented from working its way out of the opening due to vibration, et cetera, by spring clamps 33. The spring 28 is assembled under initial tension and thus always tends to pull the clutch element 21 downwardly positively engaging the clutch faces 22, 23 of the clutch element 21 and the gear 19, respectively.

A propeller shaft 34 is carried by the gear case 8 and is journally supported by a bearing 35. The shaft 34 has a propeller 36 mounted on one end and a beveled gear 37 secured to the other end adapted to engage the beveled gears 18, 19 at all times.

Figure 3:
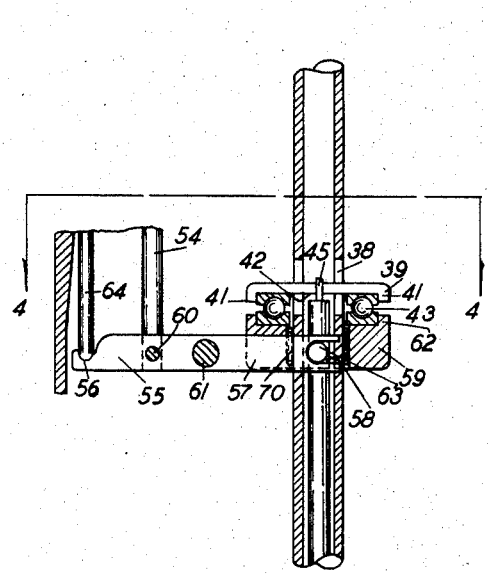
Fig. 3 is an enlarged fragmentary view in elevation of a part of the control means for the gear shift mechanism.

An elongated diametral slot 38 is disposed in the upper portion of the drive shaft 15 as shown in Figs. 1 and 3 and a rod 39 having depending ends 41 and a flat bottom surface 42 is insertable therethrough and adapted to enclose and engage the upper portion of a thrust ball bearing 43 disposed about the drive shaft 15, although any type of suitable bearing may be used. A connecting member 44 such as a rod or cable is provided with one end secured by any suitable means such as a hook 45 to the rod 39 and the opposite end is similarly connected to the pin 26 disposed in the clutch element 21.

Figure 2:
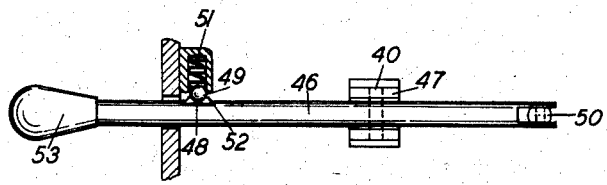
Fig. 2 is an enlarged view in section taken along line 2—2 of Fig. 1 showing a part of the control means for the gear shift mechanism.
Figure 4:
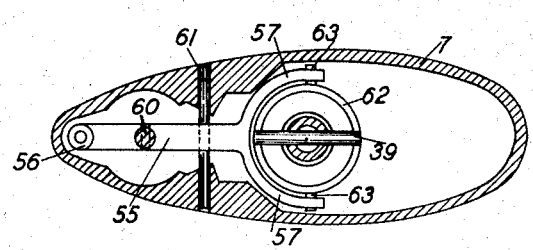
Fig. 4 is a section view taken along line 4—4 of Fig. 3.

A shifter control mechanism is provided by which the clutch element 21 is axially moved on the drive shaft 15 to engage either gear 18, 19 for rotation of the propeller shaft 34 by the engine through the drive shaft 15 in either direction, or to dispose the element 21 between the gears 18, 19 without engagement with either gear for the nonrotation of the propeller shaft 34. The control mechanism comprises a control arm 46 pivotably supported by a bracket 47 mounted on the cowl 6 by means of a transverse pin 40 passing therethrough and adapted to axially move the bearing 43 disposed about the drive shaft 15 through supporting linkage to be explained later. A detent means is provided on the cowl 6 as shown in Fig. 2 comprising a bearing 49 and a spring 51 urging the bearing 49 into engagement with any one of three detents 48 in the side of a flange 52 carried by the arm 46. The bearing 49 provides releasable means yieldably securing the arm 46 selectively in either of three control positions to be mentioned hereinafter. A handle 53 is mounted at one end of the control arm 46 and the other end is pivotably mounted at 50 to one end of a rod 54 disposed within the hollow pivot rod 14. The other end of the rod 54 is pivotably mounted at 60 to an intermediate portion of a lever 55 which is in turn pivotably mounted to the housing 7 by means of a pin 61. The lever 55 has a seat portion 56 at one end adapted to actuate the reverse lock mechanism and the other end is bifurcated to form a pair of arms 57 having an inner surface that is generally semi-circular as shown in Fig. 4 with the ends thereof provided with elongated slots 58. A bearing mounting 59, shown in Fig. 3 as an annular member provided with a suitable inner bearing 70 shown as a needle bearing is slidably disposed about the drive shaft 15. The member 59 is provided with an annular rib 62 adapted to receive the outer surface of the bearing 43, and a pair of cylindrical lugs 63 diametrally opposed from one another are adapted to engage the slots 58 of the arms 57 so that movement of the handle 53 about the pivot pin 49 imparts movement to the rod 54, lever 55, bearing mounting 59, bearing 43, rod 39 and connecting member 44 causing the clutch element 21 to be moved axially along the drive shaft 15 in either direction depending upon the direction of movement of the handle 53.

The reverse lock mechanism comprises a pin 64 having one end actuated by the seat portion 56 of the lever 55 and the other end adapted to engage a flange 65 of a locking member 66 pivotably mounted on pin 72 provided on swivel bracket 13. The locking member 66 has a hook 67 adapted to engage a tilt pin 68 carried selectively in suitable aligned holes 69 of the clamp bracket 11. Spring means 71 are provided for pivotably urging the locking member 66 in a direction causing the hook 67 to operatively engage the tilt pin 68.

When the connecting member 44 is a rigid member such as a rod, it is possible to eliminate the spring 28 by employing a bearing mounting 73 as shown in Fig. 6 which is adapted to positively actuate the rod in either axial direction along the shaft 15. The bearing mounting 73 comprises a pair of opposed and connected annular retaining members 74 disposed on opposite sides of rod 39 with a bearing 43 interposed between the rod and each of the members.

In operation, movement of the handle 53 of the control arm 46 upwardly moves the rod 54 downwardly causing the lever 55 to pivot about the pin moving the bearing mounting 59, bearing 43, rod 39 and cable 44 upwardly to urge the clutch element 21 against the initial tension of the spring 28 into engagement with the gear 18 to impart rotation to the shaft 15 and propeller 36 in the reverse direction. At the same time, the seat portion 56 of the lever 55 moves downwardly with the spring 71 pivotably urging the locking member 66 with the hook 67 thereof engaging the tilt pin 68 securing the motor to the clamp bracket 11 to prevent tilting thereof. With the control arm 46 in the downward position, the clutch element 21 is urged downwardly by the spring 28 into engagement with the gear 19 to impart rotation to the propeller shaft 34 and propeller 36 in the forward direction. Movement of the control arm 46 to the intermediate position causes the clutch element 21 to be disengaged from both of the gears 18, 19 so that the shaft 34 and propeller 36 are out of driving connection with the engine and in a "neutral" position.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In an outboard motor, the combination of: a steerable motor unit including an engine at one end and a gear housing and underwater propeller at the other end; a reversing gear unit mounted in said gear housing, said gear unit comprising vertically spaced apart gears connected to said propeller to drive said propeller in either direction of rotation; a tubular drive shaft rotatively driven by said engine and having one end insertable through said gears; a clutch element mounted on said shaft intermediate said gears and axially movable thereon; a member carried by said clutch element, said member being guided for axial movement in an elongated slot provided in said shaft and rotatable therewith; resilient means disposed within said shaft to urge said member and clutch element in one direction; connecting means disposed within said shaft and having one end connected to said member, and actuating means connected to the other end of said connecting means for effecting movement of said clutch element axially into engagement with either of said gears for driving said propeller in either direction of rotation.

2. The combination of claim 1 wherein said resilient means comprises a spring having one end connected to said member and the other end connected to said shaft.

3. The combination of claim 1 wherein said connecting means comprises an elongated flexible member.

4. The combination of claim 1 wherein said actuating means comprises a bearing mounting disposed about said shaft, a bearing disposed about said shaft and having one side thereof carried by said mounting and the other side adapted to engage one end of said connecting means, and a lever pivotably mounted to said motor unit with one end thereof connected to the bearing mounting and adapted to urge said bearing mounting axially along said shaft.

5. In an outboard motor, the combination of: a steerable motor unit pivotable about a hollow pivot pin and including an engine at one end and a gear housing and underwater propeller at the other end; a reversing gear unit mounted in said gear housing, said gear unit comprising vertically spaced apart gears connected to said propeller to drive said propeller in either direction of rotation; a tubular drive shaft rotatively driven by said engine and having one end insertable through said gears; a clutch element mounted on said shaft intermediate said gears and axially movable thereon; a pin carried by said clutch element, said pin being guided for axial movement in a first elongated slot formed in said shaft and rotatable therewith; a spring disposed within said shaft having one end connected to said pin and the other end connected to said shaft to urge said pin and clutch element in one direction; an elongated flexible member disposed within said shaft and having one end connected to said pin; a first rod member connected to the other end of said flexible member and adapted to be axially moved in a second elongated slot formed in said shaft; a bearing disposed about said shaft and having one side thereof in engagement with said rod member; a bearing mounting disposed about said shaft in engagement with said other side of said bearing, said bearing mounting having oppositely disposed lugs; a first lever pivotably mounted to said engine unit and having a bifurcated end adapted to receive said lugs; a second rod member disposed within said hollow pivot pin and having one end engaging said first lever; and a second lever pivotably mounted to said motor unit having one end connected to the other end of said second rod member and the other end of said second lever forming a handle; and detent means carried by said motor unit and cooperating with said second lever to selectively place said second lever in one of three positions wherein said clutch element is disposed out of engagement with said gears or into engagement with either of said gears for non-rotation of said propeller or rotation of said propeller in either direction respectively.

6. In an outboard motor, a steerable motor unit including an engine at one end and a gear housing and underwater propeller at the other end, a reversing gear unit mounted in said gear housing, said gear unit comprising vertically spaced gears connected to the propeller to drive the propeller in either direction of rotation, a tubular drive shaft rotatively driven by said engine and having one end insertable through said gears, a clutch element mounted on said shaft intermediate said gears and axially movable thereon, a member carried by said clutch element, said member being guided for axial movement in an elongated slot provided in said shaft and being rotatable therewith, connecting means disposed within the shaft and having one end connected to said member, and actuating means connected to the other end of said connecting means for positively effecting selective movement of said clutch element axially into engagement with either of said gears for driving said propeller in the desired direction of rotation.

References Cited in the file of this patent

UNITED STATES PATENTS

| | | |
|---|---|---|
| 1,237,849 | Williams | Aug. 21, 1917 |
| 1,382,955 | Clementson | June 28, 1921 |
| 2,026,481 | Mathias | Dec. 31, 1935 |
| 2,616,311 | Lapsley | Nov. 4, 1952 |
| 2,675,835 | Kiekhaefer | Apr. 20, 1954 |

FOREIGN PATENTS

| | | |
|---|---|---|
| 292,014 | Germany | May 19, 1916 |